(12) United States Patent
Lynn

(10) Patent No.: US 11,597,666 B1
(45) Date of Patent: Mar. 7, 2023

(54) TRANSPORTABLE SYSTEM FOR GENERATING AQUEOUS OZONE SOLUTION

(71) Applicant: Daniel W. Lynn, Omaha, NE (US)

(72) Inventor: Daniel W. Lynn, Omaha, NE (US)

( * ) Notice: Subject to any disclaimer, the term of this patent is extended or adjusted under 35 U.S.C. 154(b) by 0 days.

(21) Appl. No.: 17/934,310

(22) Filed: Sep. 22, 2022

Related U.S. Application Data

(63) Continuation-in-part of application No. 17/727,278, filed on Apr. 22, 2022, which is a continuation of application No. 17/505,000, filed on Oct. 19, 2021, now Pat. No. 11,312,644, which is a continuation-in-part of application No. 17/378,977, filed on Jul. 19, 2021, now Pat. No. 11,198,627, which is a continuation-in-part of application No. 17/325,966, filed on May 20, 2021, now Pat. No. 11,098,910, which is a continuation-in-part of application No. 17/200,799, filed on Mar. 13, 2021, now Pat. No. 11,045,571.

(51) Int. Cl.
| | |
|---|---|
| *C02F 1/78* | (2023.01) |
| *B01F 23/23* | (2022.01) |
| *B01F 23/232* | (2022.01) |
| *B01F 23/237* | (2022.01) |

(52) U.S. Cl.
CPC .............. *C02F 1/78* (2013.01); *B01F 23/23* (2022.01); *B01F 23/232* (2022.01); *B01F 23/237613* (2022.01); *C02F 2201/782* (2013.01); *C02F 2209/04* (2013.01); *C02F 2303/04* (2013.01)

(58) Field of Classification Search
CPC ........... C02F 1/78; B01F 23/23; B01F 23/232
See application file for complete search history.

(56) References Cited

U.S. PATENT DOCUMENTS

| | | | |
|---|---|---|---|
| 5,853,014 A | 12/1998 | Rosenauer | |
| 6,153,105 A | 11/2000 | Tadlock et al. | |
| 6,334,328 B1 | 1/2002 | Brill | |
| 6,685,825 B1 | 2/2004 | Chang | |
| 6,854,747 B2 * | 2/2005 | Erickson | ............... B62B 5/0013 150/154 |
| 8,071,526 B2 | 12/2011 | Lynn | |
| 8,075,705 B2 | 12/2011 | Lynn | |
| 9,068,149 B2 | 6/2015 | Lynn | |

(Continued)

FOREIGN PATENT DOCUMENTS

ES 1174333 U 4/2017

*Primary Examiner* — Robert A Hopkins
(74) *Attorney, Agent, or Firm* — Nasr Patent Law LLC; Faisal K. Abou-Nasr

(57) ABSTRACT

A transportable system for generating aqueous ozone solution includes a wheeled frame and an aqueous ozone solution supply unit that is coupled to the wheeled frame. The aqueous ozone solution supply unit is configured to produce an aqueous ozone solution onsite by generating and injecting ozone into water received from an onsite water source. The transportable system further includes an outer enclosure configured to surround at least a portion of the wheeled frame and configured to contain the aqueous ozone solution supply unit. The outer enclosure is also configured to store one or more external components for the aqueous ozone solution supply unit and one or more cleaning accessories when the aqueous ozone solution supply unit is being transported via the wheeled frame.

19 Claims, 10 Drawing Sheets

(56) References Cited

U.S. PATENT DOCUMENTS

| | | |
|---|---|---|
| 9,151,528 B2 | 10/2015 | Erbs et al. |
| 9,174,845 B2 | 11/2015 | Lynn |
| 9,522,348 B2 | 12/2016 | Lynn |
| 2002/0127158 A1 | 9/2002 | Holsclaw et al. |
| 2003/0209502 A1 | 11/2003 | Lacasse et al. |
| 2004/0004042 A1 | 1/2004 | Hadley et al. |
| 2004/0074252 A1 | 4/2004 | Shelton |
| 2004/0168989 A1 | 9/2004 | Tempest |
| 2009/0142225 A1 | 6/2009 | Tornqvist |
| 2009/0185959 A1 | 9/2009 | Weber et al. |
| 2010/0219137 A1 | 9/2010 | Lacasse |
| 2013/0193081 A1 | 8/2013 | Vasiliu et al. |
| 2013/0341285 A1 | 12/2013 | Marion |
| 2014/0027388 A1 | 1/2014 | Constant |
| 2014/0263097 A1 | 9/2014 | Lynn |
| 2016/0251243 A1 | 9/2016 | Lynn |

\* cited by examiner

TRANSPORTABLE SYSTEM FOR GENERATING AQUEOUS OZONE SOLUTION

CROSS-REFERENCE TO RELATED APPLICATIONS

The present application is a Continuation-in-Part of U.S. application Ser. No. 17/727,278 filed Apr. 22, 2022 and titled "TRANSPORTABLE OZONE SUPPLY UNIT WITH ONE OR MORE AUXILIARY COMPARTMENTS CONTAINING MIXING ASSEMBLIES FOR GENERATING AQUEOUS OZONE SOLUTION," which is a Continuation of U.S. application Ser. No. 17/505,000 filed Oct. 19, 2021 and titled "TRANSPORTABLE OZONE SUPPLY UNIT WITH ONE OR MORE AUXILIARY COMPARTMENTS CONTAINING MIXING ASSEMBLIES FOR GENERATING AQUEOUS OZONE SOLUTION," which is a Continuation-in-Part of U.S. application Ser. No. 17/378,977 filed Jul. 19, 2021 and titled "OZONE SUPPLY UNIT WITH AUXILIARY COMPARTMENT CONTAINING CONTROLLED SUCTION MIXING ASSEMBLY FOR GENERATING AQUEOUS OZONE SOLUTION," which is a Continuation-in-Part of U.S. application Ser. No. 17/325,966 filed May 20, 2021 and titled "HVAC DECONTAMINATION SYSTEM WITH REGULATED OZONE OUTPUT BASED ON MONITORED OZONE LEVEL IN AMBIENT AIR," which is a Continuation-in-Part of U.S. application Ser. No. 17/200,799 filed Mar. 13, 2021 and titled "REDUCED NOISE AIR DECONTAMINATOR," all of which are incorporated herein by reference.

TECHNICAL FIELD

The present disclosure relates to systems for creating aqueous ozone solutions.

BACKGROUND

Water intended for potable use (e.g., drinking water), may contain disease-causing organisms, or pathogens, which can originate from the source of the water, from resistance to water treatment techniques, from improper or ineffectual water treatment techniques, or so forth. Pathogens include various types of bacteria, viruses, protozoan parasites, and other organisms. To protect drinking water from disease-causing organisms, or pathogens, water suppliers often add a disinfectant, such as chlorine, to the water. However, disinfection practices can be ineffectual because certain microbial pathogens, such as *Cryptosporidium*, are highly resistant to traditional disinfection practices. Also, disinfectants themselves can react with naturally occurring materials in the water to form byproducts, such as trihalomethanes and haloacetic acids, which may pose health risks.

A major challenge for water suppliers is how to control and limit the risks from pathogens and disinfection byproducts. It is important to provide protection from pathogens while simultaneously minimizing health risks to the population from disinfection byproducts. Oxidation reduction potential (ORP) can be used for water system monitoring to reflect the antimicrobial potential of the water, without regard to the water quality, with the benefit of a single-value measure of the disinfection potential, showing the activity of the disinfectant rather than the applied dose.

The ORP of water can be increased by injecting ozone into the water to create an ozone and water solution. This aqueous ozone solution can be used to disinfect/degrease surfaces. Thus, it is advantageous to leverage the disinfecting properties of ozone by producing aqueous ozone solution onsite for janitorial applications.

SUMMARY

Aspects of this disclosure are directed to a transportable system for generating aqueous ozone solution (AOS). In embodiments, the transportable system includes a wheeled frame with an outer enclosure surrounding at least a portion of the wheeled frame. The transportable system further includes an AOS supply unit disposed within the outer enclosure. The AOS supply unit includes a supply unit enclosure coupled to the wheeled frame with the supply unit enclosure having one or more openings for a water inlet and an AOS outlet. The AOS supply unit further includes one or more ozone generators and a fluid mixer disposed within the supply unit enclosure. The fluid mixer is fluidically coupled to the one or more ozone generators and configured to inject ozone generated by the one or more ozone generators into water received from a water source via the water inlet to produce an aqueous ozone solution that is output via the AOS outlet. The outer enclosure contains the AOS supply unit and is also configured to store one or more external components for the AOS supply unit and one or more cleaning accessories when the AOS supply unit is being transported via the wheeled frame.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Figure 1:
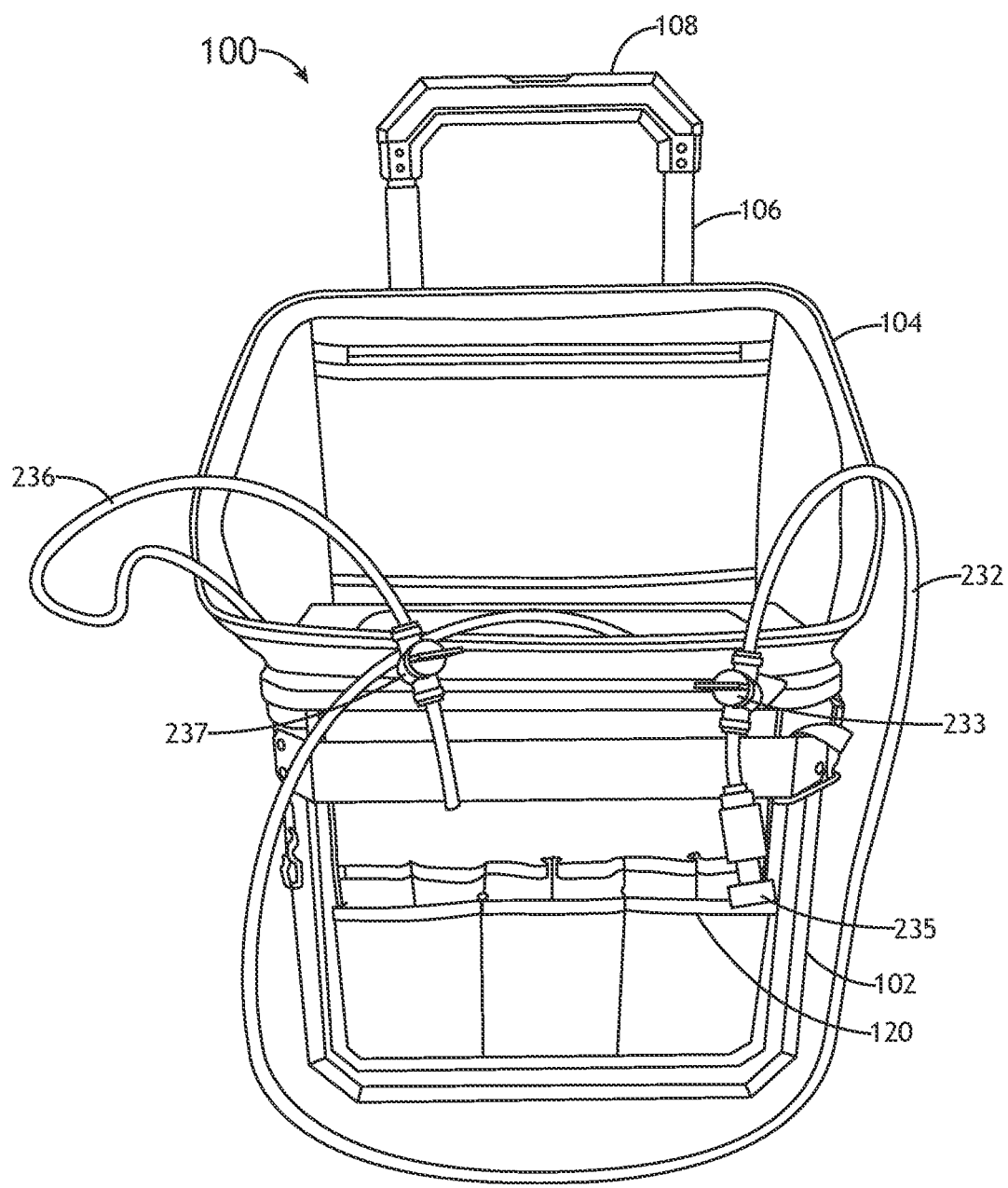
FIG. 1 is a front view of a transportable system for generating aqueous ozone solution (AOS), in accordance with one or more embodiments of this disclosure.

Reference will now be made in detail to the subject matter disclosed, which is illustrated in the accompanying drawings.

Embodiments of this disclosure are directed to a transportable system that generates an aqueous ozone solution (AOS) for cleaning purposes. The transportable system can be used for cleansing and/or degreasing hard surfaces such as plastic, glass, ceramic, porcelain, stainless steel, or the like. The transportable system can also be used for cleansing and/or degreasing equipment such as food service equipment which may include, but are not limited to, ovens, ranges, fryers, grills, steam cookers, oven stacks, refrigerators, coolers, holding cabinets, cold food tables, worktables, ice machines, faucets, beverage dispensing equipment, beer dispensers, shelving food displays, dish washing equipment, and grease traps. The transportable system can also be used for water treatment (e.g., water purification, disinfection, and/or softening applications).

An ORP value can be used for water system monitoring to reflect the antimicrobial potential of a given sample of water. ORP is measured in millivolts (mV), with typically no correction for solution temperature, where a positive voltage shows a solution attracting electrons (e.g., an oxidizing agent). For instance, chlorinated water will show a positive ORP value whereas sodium sulfite (a reducing agent) loses electrons and will show a negative ORP value. Similar to pH, ORP is not a measurement of concentration directly, but rather of activity level. In a solution of only one active component, ORP indicates concentration. The World Health Organization (WHO) adopted an ORP standard for drinking water disinfection of 650 millivolts. That is, the WHO stated that when the oxidation-reduction potential in a body of water measures 650 (about ⅔ of a volt), the sanitizer in the water is active enough to destroy harmful organisms almost instantaneously. For example, *E. coli, Salmonella, Listeria*, and Staph pathogens have survival times of under 30 seconds when the ORP is above 650 mV, compared against >300 seconds when it is below 485 mV.

An example ORP sensor uses a small platinum surface to accumulate charge without reacting chemically. That charge is measured relative to the solution, so the solution "ground" voltage comes from the reference junction. For example, an ORP probe can be considered a millivolt meter, measuring the voltage across a circuit formed by a reference electrode constructed of silver wire (in effect, the negative pole of the circuit), and a measuring electrode constructed of a platinum band (the positive pole), with the water in-between.

Increasingly, microbial issues are commanding the attention of water treatment operators, regulators, media, and consumers. There are many treatment options to eliminate pathogenic microbes from drinking water. One such option includes ozone (O3), an oxidizing agent approved for drinking water treatment by the U.S. Environmental Protection Agency. For instance, ozone is one of the strongest disinfectants approved for potable water treatment capable of inactivating bacteria, viruses, *Giardia*, and *Cryptosporidium*.

The disclosed system may be configured to output an AOS including water with an ORP of about 600 mV to about 1000 mV, with particular embodiments configured to output water having an ORP of about 700 mV to about 900 mV to provide pathogenic control. Additionally, the transportable system may be configured to reduce the surface tension of the water being used to cleanse and/or degrease hard surfaces and equipment by creating an AOS (e.g., a water and ozone solution) wherein the surface tension of the water is reduced from about 72 Millinewtons per meter at 20 degrees Centigrade to about 48-58 Millinewtons per meter at 20 degrees Centigrade to greatly improve the cleansing and/or degreasing qualities thereof.

FIGS. 1 through 10 illustrate a transportable system 100 that generates an AOS for cleaning purposes, in accordance with one or more embodiments of this disclosure.

Figure 2:
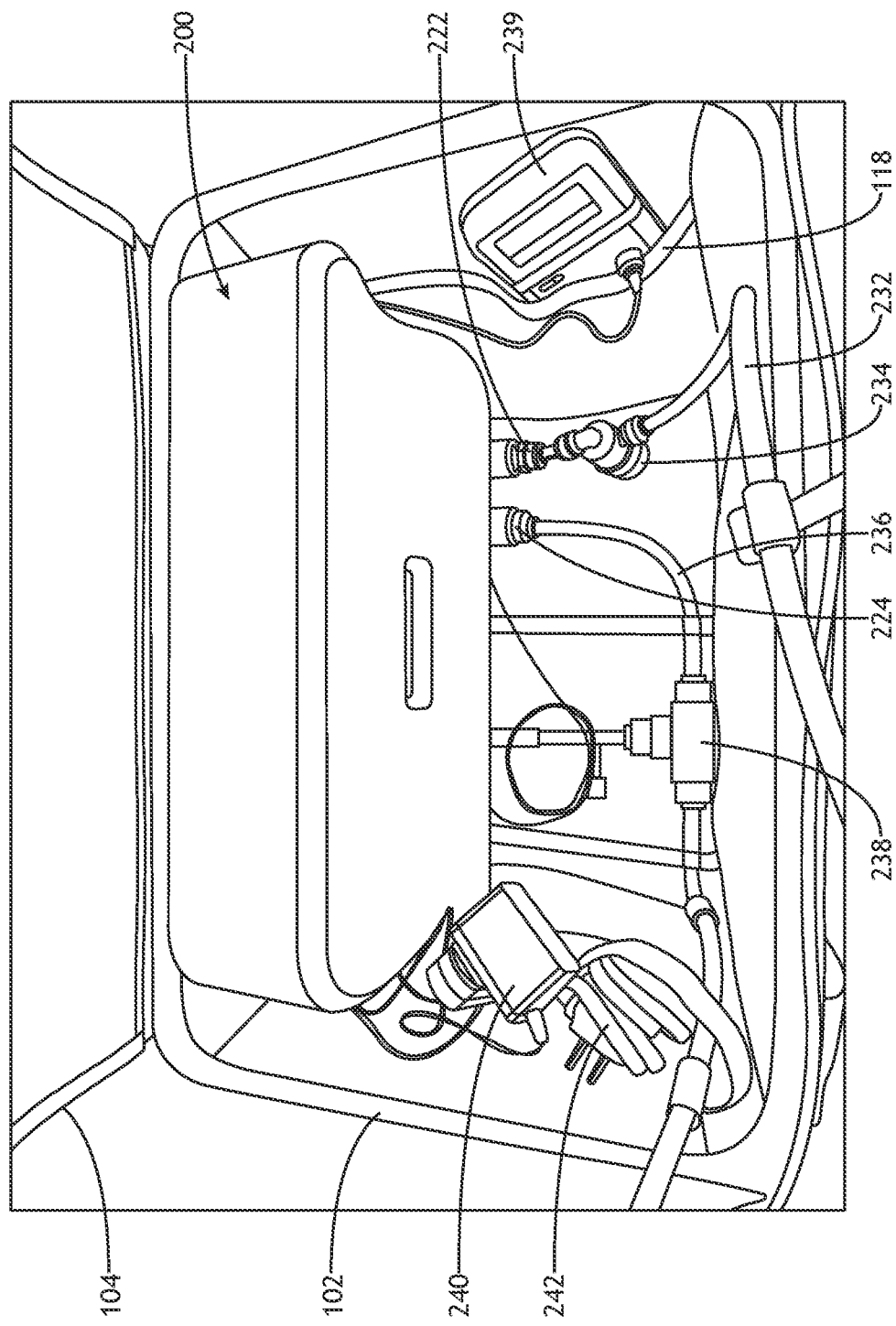
FIG. 2 is a perspective view of the transportable system for generating AOS, wherein an outer enclosure of the transportable system is opened up to show an AOS supply unit of transportable system and one or more external components and/or accessories for the AOS supply unit, in accordance with one or more embodiments of this disclosure.

As shown in FIGS. 1 and 2, the transportable system 100 includes a wheeled frame 106 with an AOS supply unit 200 mounted to the wheeled frame 106. The wheeled frame 106 is coupled to and/or at least partially surrounded by an outer enclosure 102 that contains the AOS supply unit 200. The outer enclosure 102 is also configured to store one or more external components for the AOS supply unit 200 and one or more cleaning accessories when the AOS supply unit is being transported via the wheeled frame 106. In this manner, the transportable system 100 can be conveniently moved from one place to another with all its components and cleaning accessories for onsite generation and use of AOS.

Figure 7:
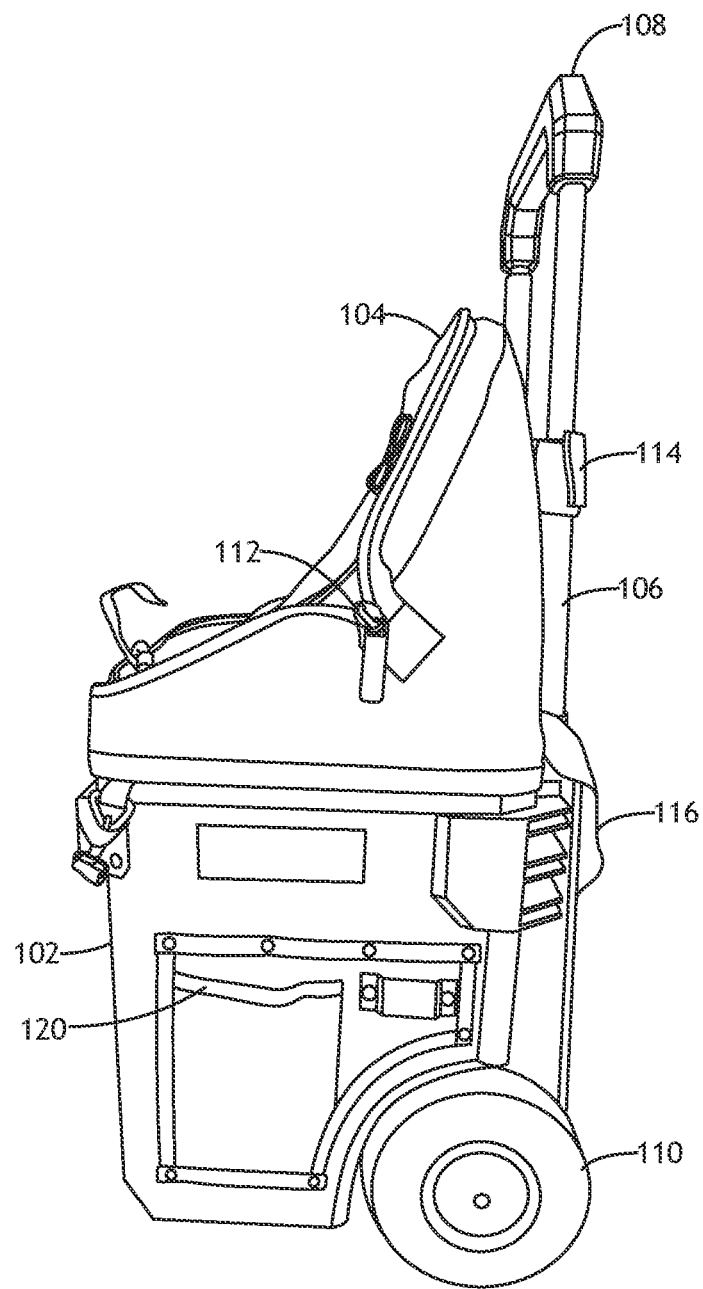
FIG. 7 is a side view of the transportable system for generating AOS, in accordance with one or more embodiments of this disclosure.
Figure 8:
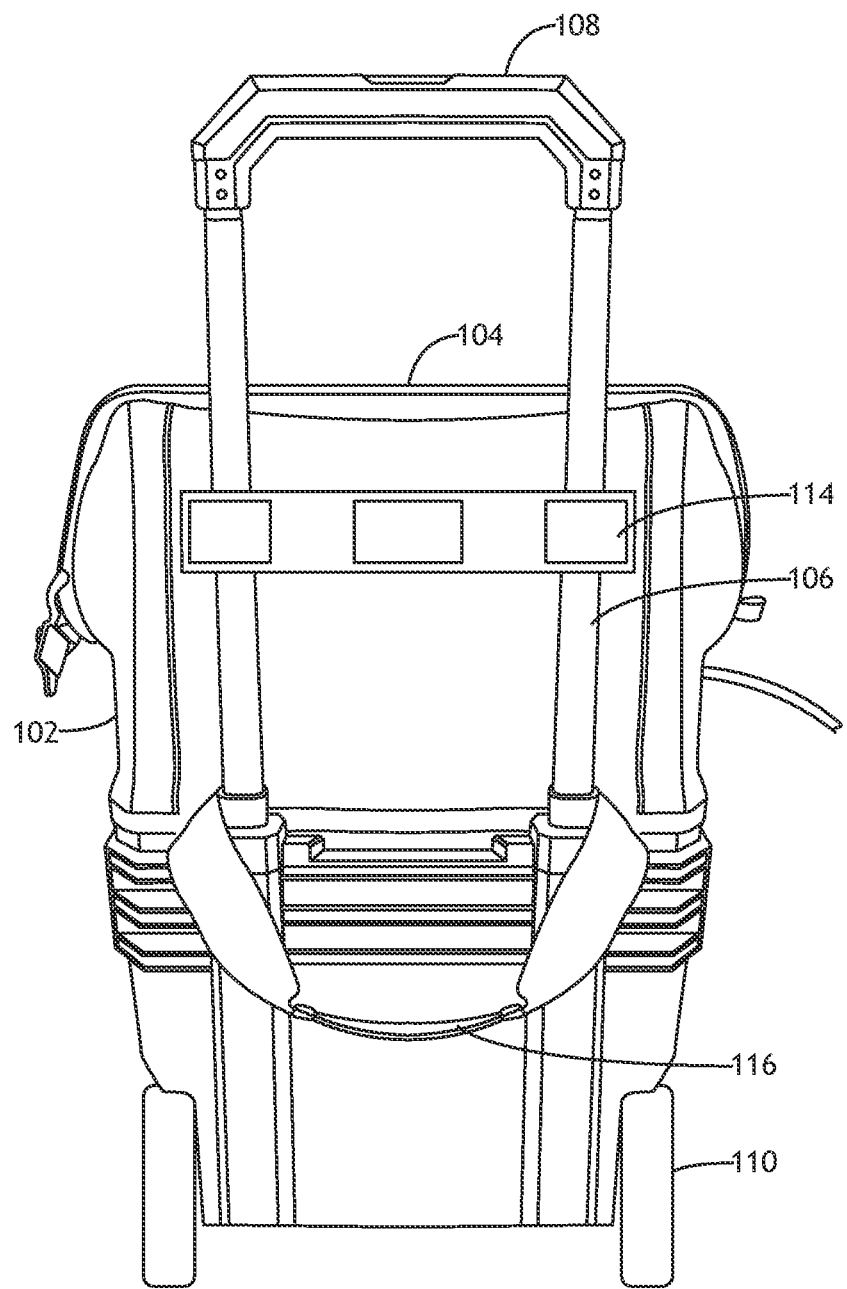
FIG. 8 is a rear view of the transportable system for generating AOS, in accordance with one or more embodiments of this disclosure.

In embodiments, the wheeled frame 106 includes one or more vertical support members to which the AOS supply unit 200 can be mounted and a grip bar 108 on top of the one or more vertical support members for pushing/pulling the wheeled frame 106. In some embodiments, the one or more vertical support members are telescopic support members that can be retracted for stowage and extended for transportation. As shown in FIGS. 7 and 8, the wheeled frame 106 includes at two wheels 110 (e.g., fixed wheels, pivot-mounted wheels, coasters, or the like) at a base of the one or more vertical support members to facilitate easier transport (e.g., rolling or gliding) of the transportable system 100 from one place to another.

In some embodiments, the outer enclosure 102 is at least partially made of fabric and has a top portion 104 (e.g., upper flap) that can be lifted up to access internal compartments of the outer enclosure 102 (e.g., to access compartments containing the AOS supply unit 200, its components, and/or system accessories). For example, the outer enclosure 102 and the wheeled frame 106 may be assembled in the form of a wheeled duffle bag, preferably in the form of an upright standing wheeled duffle bag.

Figure 10:
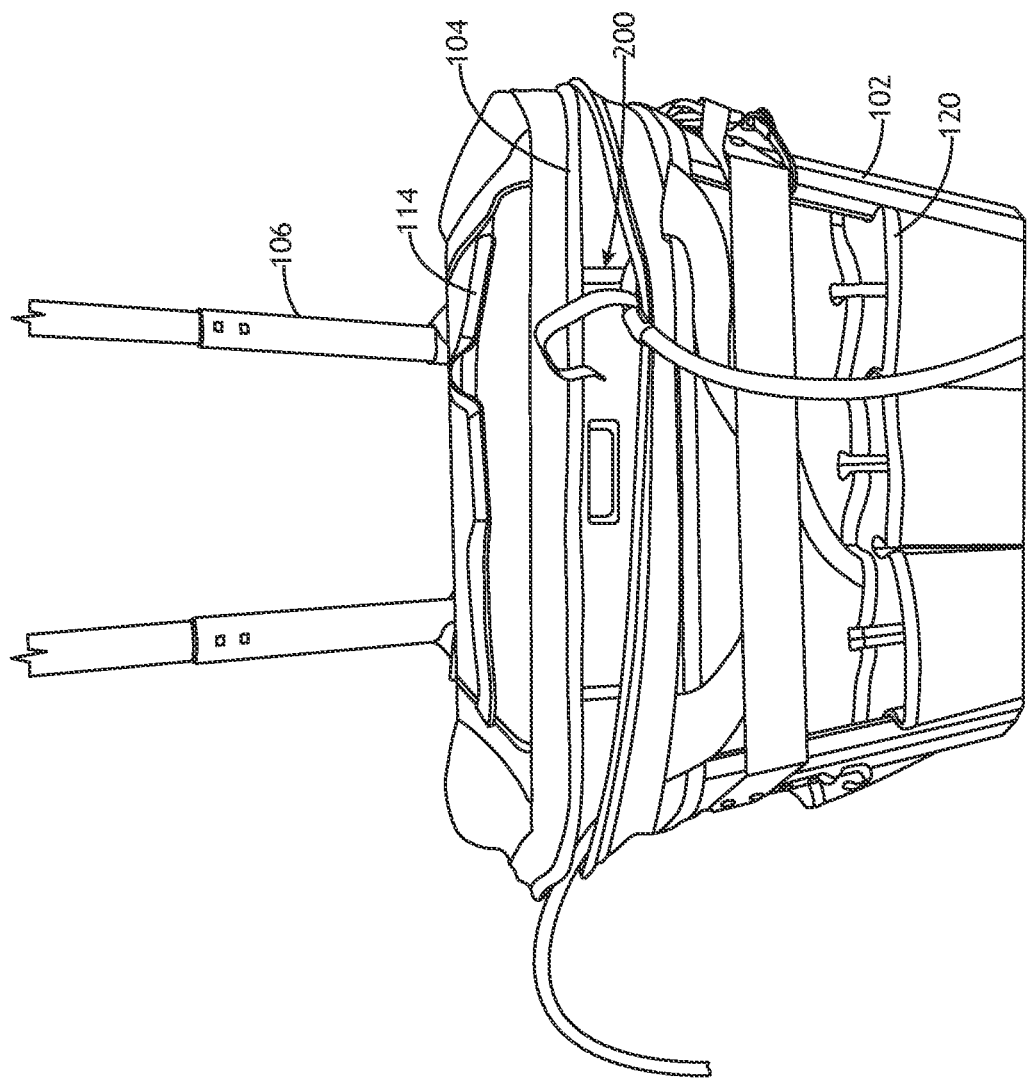
FIG. 10 is a perspective view of the transportable system for generating AOS, wherein the outer enclosure of the transportable system is in a partially closed configuration, in accordance with one or more embodiments of this disclosure.

As shown in FIG. 7, the outer enclosure 102 may include a zipper 112 (or any other type of fastener) for securing the top portion 104 of the outer enclosure 102 in a closed position (i.e., for zipping up or other fastening shut the outer enclosure 102). FIG. 10 shows an example of the outer enclosure 102 in a partially closed (i.e., closed but not fastened) configuration. To fully close the outer enclosure 102, the gap between the top portion 104 and the rest of the outer enclosure 102 can be zipped up or otherwise fastened (e.g., as discussed above). This can be done after all components and accessories are stored in order to securely transport the system 100 from one place to another.

In an example embodiment illustrated in FIG. 8, the outer enclosure 102 also includes one or more Velcro strips 114 configured to fasten the top portion 104 of the outer enclosure 102 to the wheeled frame 106 (e.g., to the one or more vertical support bars) when the top portion 104 of the outer enclosure 102 is unzipped/unsecured so that the outer enclosure 102 is held open. Also shown in FIG. 8, the outer enclosure 102 may include one or more handles for carrying the transportable system 100 when the outer enclosure 102 is zipped shut.

Referring again to FIGS. 1 and 2, the outer enclosure 102 may include a plurality of inner pockets 118 (e.g., see FIG. 2) and outer pockets 120 (e.g., see FIG. 1) that are at least partially made from the same fabric as the outer enclosure 102. For example, the pockets may be sewn into the outer enclosure 102. These pockets can be used to hold various components or accessories within the outer enclosure 102. For example, in an embodiment shown in FIG. 2, the inner pockets 118 are used to hold a number of components (e.g., power cord/adapter 240, extension cord 242, ORP monitor control unit 239).

Figure 9:
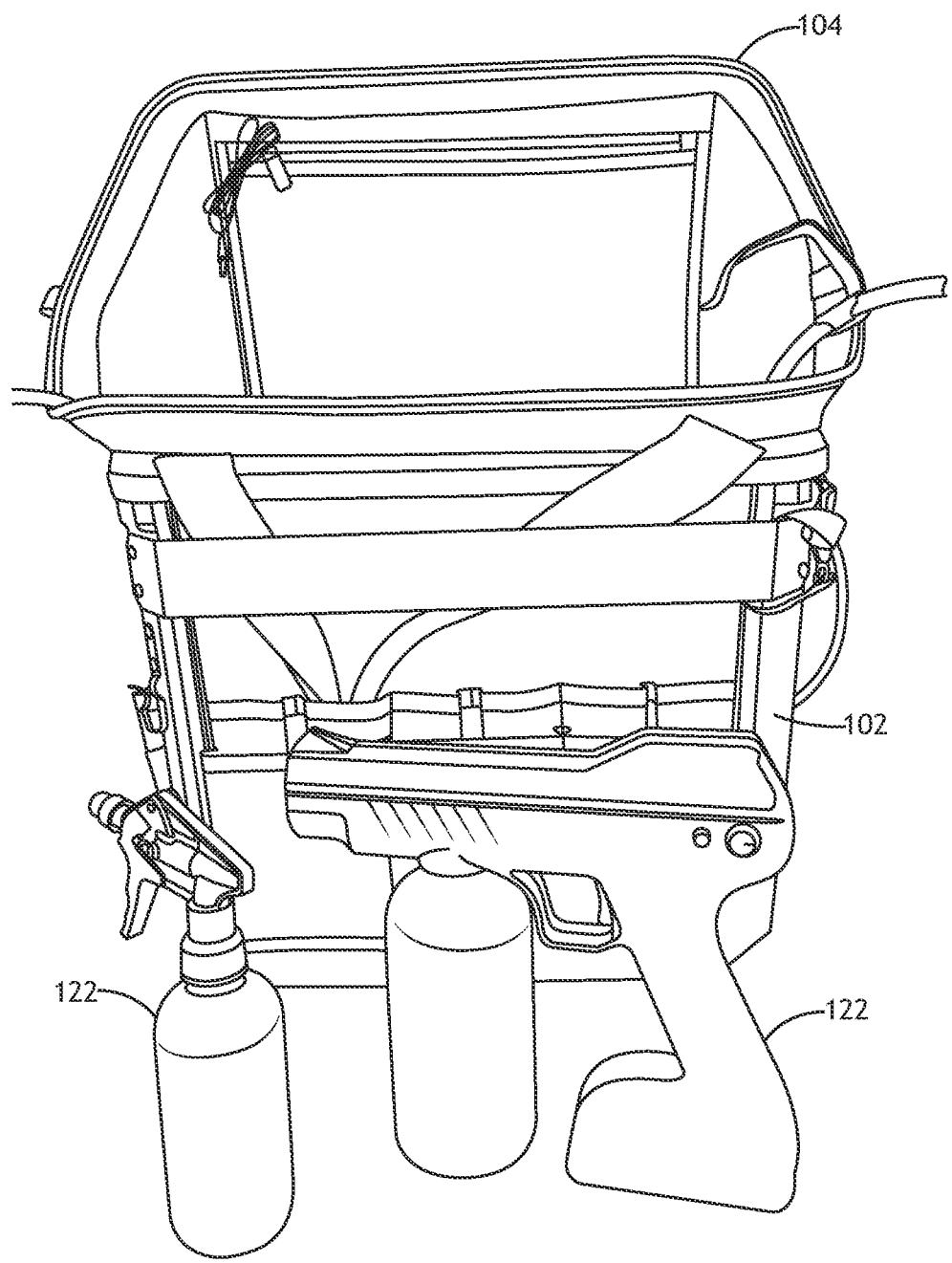
FIG. 9 is a perspective view of the transportable system for generating AOS with one or more cleaning accessories that can be stored within the outer enclosure of the transportable system, in accordance with one or more embodiments of this disclosure.

In an example embodiment illustrated in FIG. 2, the outer enclosure 102 is configured to store one or more external components for the AOS supply unit 200 including, but not limited to, a power cord/adapter 240; an extension cord 242; an ORP monitor 238; an ORP monitor control unit 239; a water input line 232; and/or an AOS output line 236. FIG. 9 shows examples of one or more cleaning accessories that may also be contained and transported within the outer enclosure 102 with the AOS supply unit 200 and its external components. In embodiments, the one or more cleaning accessories may include at least one spray device 122 such as, but not limited to, a spray bottle or a portable electric sprayer configured to be filled with the AOS dispensed by the AOS supply unit 200. The spray device 122 (e.g., spray bottle or portable electric sprayer) may be configured to release a spray, a mist, or a foam formed the AOS to disinfect or degrease a surface. In some embodiments, the spray device 122 includes a porous nozzle configured to release a mist formed from the AOS. For example, the porous nozzle may enable a portable electric sprayer to nebulize the AOS so it can be sprayed as a fine mist across a surface to disinfect/degrease the surface or within an enclosed area to disinfect the air. A spray bottle can also be equipped with a porous nozzle configured to release a mist formed from the AOS. In some embodiments, the one or more cleaning accessories may include a spray gun that attaches directly to the AOS output line 236 of the AOS supply unit 200 and dispenses AOS through a nozzle (e.g., a pressurized nozzle, spray pattern nozzle, or other flow control/conditioning nozzle).

The AOS supply unit 200 is configured to generate and mix ozone into water in order to output an AOS (e.g., a water and ozone solution). Although the AOS supply unit 200 and system 100 are discussed with regard to applications that employ water to generate an AOS, it is contemplated that the AOS supply unit 200/system 100 may be configured to generate other types of ozonated fluid solutions for the purposes of cleansing, degreasing, decontaminating, and/or fluid treatment.

Figure 3:
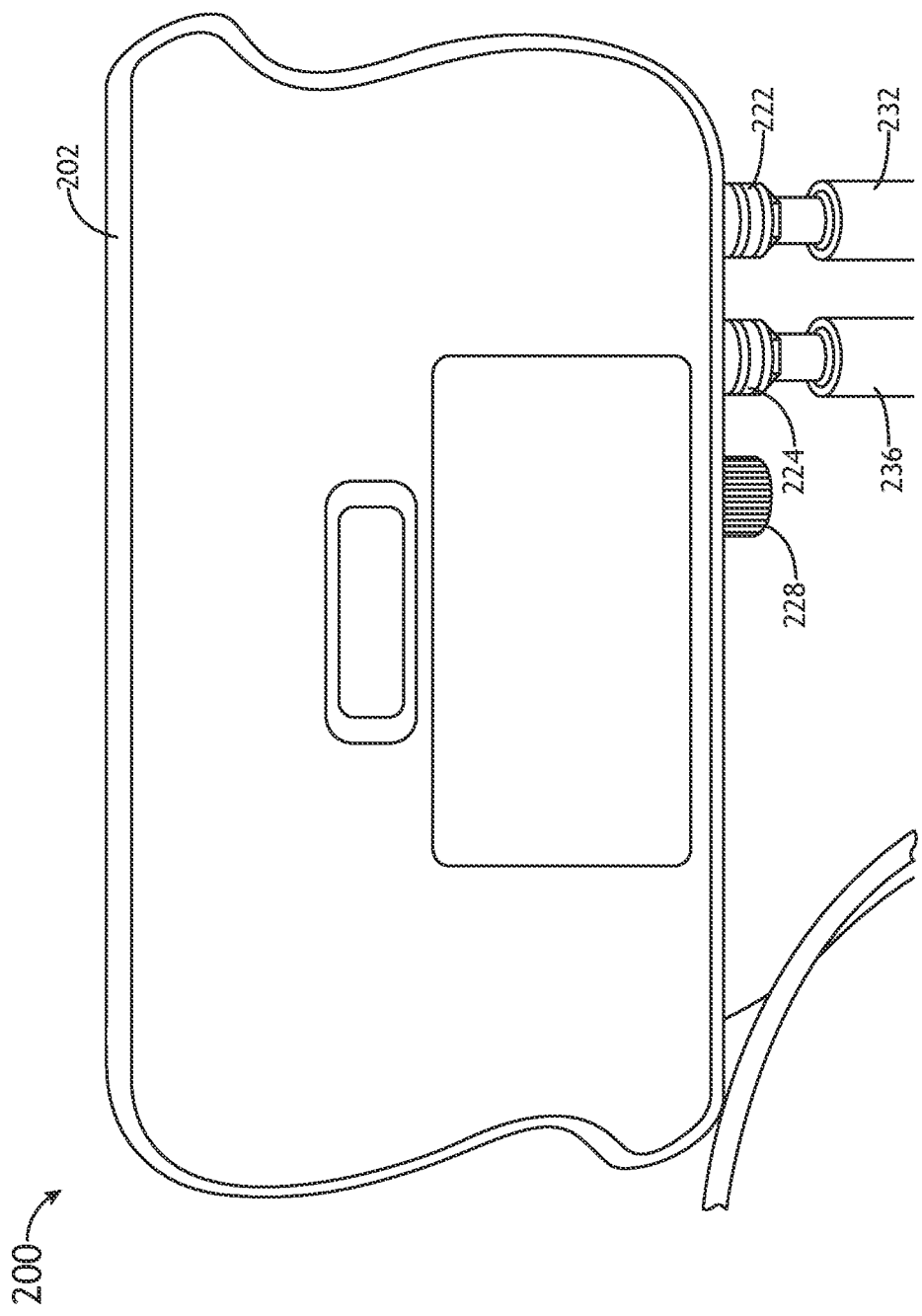
FIG. 3 is a front view of the AOS supply unit, in accordance with one or more embodiments of this disclosure.
Figure 4:
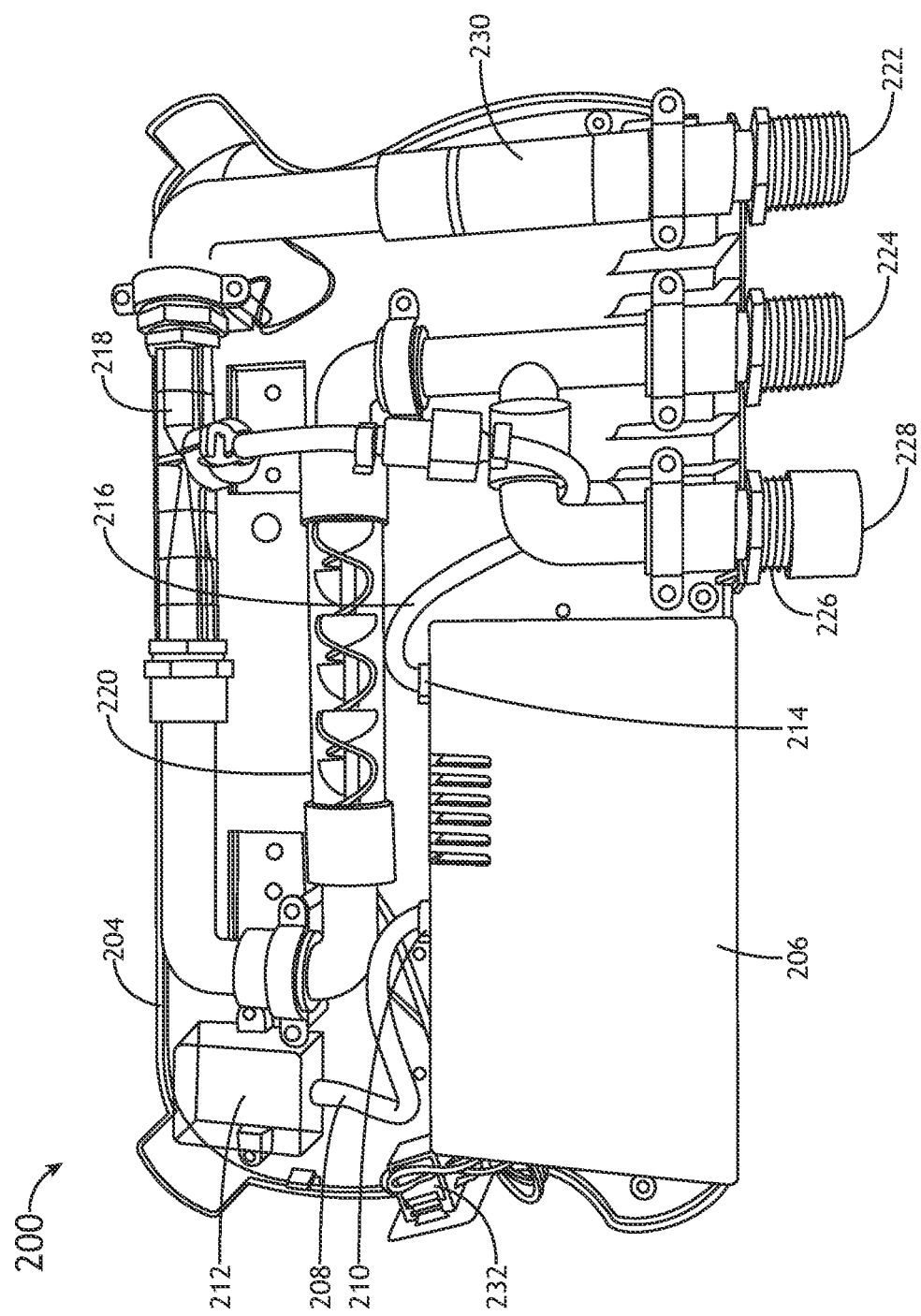
FIG. 4 is a front view of the AOS supply unit, wherein a supply unit enclosure of the AOS supply unit is removed to show components for generating AOS that are contained within the AOS supply unit, in accordance with one or more embodiments of this disclosure.

As shown in FIG. 3, the AOS supply unit 200 may include a supply unit enclosure 202 with openings for a water inlet 222 and an AOS outlet 224. The supply unit enclosure 202 may comprise a securable lid/cover that can enclose (e.g., when secured/closed) and provide access to (e.g., when removed/opened) the components housed in an interior portion of the supply unit enclosure 202. As shown in FIG. 4, the internal components may be secured to a base member 204 that is configured to be secured to the supply unit enclosure 202 by one or more fasteners (e.g., screws to mate with bores in the supply unit enclosure 202/base member 204, latches, interference fit fasteners, clipping fasteners, magnetic fasteners, or the like). The supply unit enclosure 202 may further include coupling portions to couple with a power cable, a switch to engage or disengage power to the AOS supply unit 200/system 100, an indicator (e.g., a light source), any combination thereof, and so forth.

FIG. 4 is an illustration of the AOS supply unit 200 with the supply unit enclosure 202 removed from the base member 204, in accordance with one or more embodiments of this disclosure. As shown in FIG. 4, the AOS supply unit 200 includes one or more generators 206 configured to be disposed within the supply unit enclosure 202. The one or more ozone generators 206 include one or more air intake ports 210 configured to receive air (e.g., ambient air) via one or more tubes 208 (e.g., flexible tubing, pipes, etc.). In some embodiments, the AOS supply unit 200 further includes an air stabilizer 212 that is configured to hold air before the air is supplied to the one or more ozone generators 206 to generate ozone. For example, the air stabilizer 212 may be fluidically coupled to the one or more air intake ports 210 of the one or more ozone generators 206 via the one or more tubes 208. The air stabilizer 212 may comprise a box or other shaped container (e.g., plastic, metal, or glass box/container) that defines a cavity within the supply unit enclosure 204. This cavity defined by the air stabilizer 212 is configured to hold a volume of air in order to improve airflow to the one or more ozone generators 206 by preventing obstruction of the one or more tubes 208 and/or the one or more air intake ports 210.

In embodiments, the one or more ozone generators 206 may include one or more corona discharge tubes configured to use oxygen in the air supplied via the one or more air intake ports 210 to generate ozone, such as through splitting of oxygen molecules in the air through electrical discharge caused by supplying power to a dielectric material within the corona discharge tube. The one or more ozone generators 206 are configured to convert oxygen from incoming air into ozone. The one or more ozone generators 206 may be powered by a power source (e.g., power cord/adapter 240, which may comprise a 120V/240V power supply unit, power distribution circuit, or the like). In some embodiments, a power signal from power source may be transformed via a transformer suitable for applying the voltage to the dielectric within the corona discharge tube of an ozone generator.

The AOS supply unit 200 may include a relay 232 (e.g., a switchboard with analog or digital logic circuits) that controls distribution of power and/or communication signals within the AOS supply unit 200. For example, the relay 232 may be connected to the power source, a power switch, an indicator, the one or more ozone generators 206, and any sensors/switches (e.g., flow switch 230 and/or ORP monitor 238) of the AOS supply unit 200/system 100.

In some embodiments, the one or more ozone generators 206 may be operated at 110 volts/60 Hz and have an operating frequency of about 450 kHz and 550 kHz, with a power rating of less than about 15 watts, and with a unit performance for electrical consumption of about 32 watts. For example, the one or more ozone generators 206 may have an operating frequency of about 480 kHz. Further, the one or more ozone generators 206 can be provided according to ISO 9001 CE standards.

Each of the one or more ozone generators 206 may be configured to produce from about 800 mg ozone per hour to about 1200 mg ozone per hour, although other ranges may be appropriate depending on the application. In some embodiments, each of the one or more ozone generators 206 produces about 1000 mg ozone per hour. The one or more ozone generators 206 may include other methods and systems for generating ozone, including but not limited to, electrochemical cells configured to generate ozone from water by placing an anode and a cathode in contact with opposite sides of a proton exchange membrane (PEM), and supplying power to the cell, whereby water flowing over the surface of the anode breaks down into hydrogen atoms and oxygen atoms that assemble to form $O_3$ (ozone).

The AOS supply unit 200 may further include one or more air dryers (or filters), which may be externally coupled to the supply unit enclosure 202. The one or more air dryers are configured to remove moisture from air before the air is supplied to the one or more ozone generators 206 through the one or more air intake ports 210. The one or more air dryers may be configured to dry the air to a minus dew point by removing water vapor or moisture therefrom, where the water could inhibit the production of ozone by the one or more ozone generators 206. In some embodiments, the one or more air dryers are configured to remove moisture from air before the air flows into the air stabilizer 212.

The AOS supply unit 200 may include a fluid mixer 218 fluidically coupled to the one or more ozone generators 206 by one or more tubes 214 (e.g., flexible tubing, pipes, etc.) for transferring ozone from the one or more ozone generators 206 to the fluid mixer 218. In some embodiments, the fluid mixer 218 is disposed within the supply unit enclosure 202, fluidically coupled between a water inlet 222 and an AOS outlet 224. The fluid mixer 218 may be configured to introduce/inject ozone generated by the one or more ozone generators 206 into water flowing between the water inlet 222 and the AOS outlet 224. In this manner, the fluid mixer 218 mixes the ozone from the one or more ozone generators 206 with the water flowing into the AOS supply unit 200 to produce an AOS that is output via the AOS outlet 224.

The fluid mixer 218 may be a multi-port coupler including an inlet, an outlet, and an ozone input port between the inlet and the outlet. The multi-port coupler may simply be pipe/tube fittings with an ozone input port formed therein, 3-way pipe/tube fittings, or the like. In some embodiments, the multi-port coupler includes a venturi. A venturi can include an injector venturi design (e.g., a "T" design), where the venturi is coupled between the inlet and the outlet, and where ozone is introduced to the venturi through another port (i.e., the ozone input port) positioned perpendicular to the flow path of the water (from the inlet to the outlet). During operation, ozone generated by the one or more ozone generators 206 is drawn into the venturi and mixed with the water stream flowing from the inlet to the outlet. A pressure differential between the inlet and the outlet may serve to facilitate drawing the ozone into the venturi and to facilitate mixing of the ozone and the water. In some embodiments, a pressure differential greater than 20 psi inlet over outlet (e.g., at least a 20 psi difference between the inlet and the outlet, with pressure higher at the water inlet) is provided to generate negative suction in the venturi to thereby draw in the generated ozone, while assuring the energy for water flow and pressure for operation of the venturi.

In order to further increase effectiveness of the mixing process delivered by the venturi, the AOS may pass through an in-line mixer 220 coupled between fluid mixer 218 (e.g., a venturi) and the AOS outlet 224. The in-line mixer 220 can facilitate further breaking or mixing of ozone bubbles already introduced to the water to generate a mixture (or solution) of water and substantially uniform-sized ozone bubbles. The small uniform-size ozone bubbles can adhere to each other to lower the surface tension of the AOS. For example, water can have a surface tension of about 72 Millinewtons, whereas the solution of water and substantially uniform-sized ozone bubbles can have a surface tension of about 48-58 Millinewtons. In embodiments, the in-line mixer 220 has an internal diameter that equals an internal diameter of the output port of a venturi to which the in-line mixer 220 is coupled. The same internal diameter can provide an uninterrupted transition of the fluid flowing from the venturi to the in-line mixer, such as to maintain a vortex action or mixing action of the water and the ozone bubbles. The in-line mixer 220 also provides increased contact time between the water and ozone bubbles and can facilitate preparation of uniform ozone bubble size. In some embodiments, the in-line mixer 220 has a length of about two inches downstream from the venturi, which can allow sufficient time for the velocity of the vortex action caused by the pressure differential of the venturi to crush the gaseous bubbles entrained in the solution into uniformed size bubbles. The in-line mixer 220 can also reintroduce undissolved gas back into the solution resulting in increased efficiency as well as reduced off-gas at the point of application. The in-line mixer 220 can include multiple chambers through which the AOS flows. The size of the chambers can be determined based on the water flow (e.g., throughput), gas mixing, and desired time exposure. In some embodiments, the AOS supply unit 200 produces a stream of AOS at the AOS outlet 224 having a molar concentration of ozone of at least 20%, or more particularly at least 25%, far surpassing previous systems that have mass gas transfer rates of less than 10%.

The AOS supply unit 200 may further include or may be coupled with a flow switch 230 that is configured to detect water flow through the AOS supply unit 200/system 100. As shown in FIG. 4, the flow switch 230 may be disposed within the supply unit enclosure 202. For example, the flow switch 230 may be fluidically coupled in-line with the fluid mixer 218, between the water inlet 222 and the AOS outlet 224. In other embodiments, the flow switch 230 may be external to the supply unit enclosure 202 and/or at a distance from the supply unit enclosure 202. For example, the flow switch 230 may be coupled to any of the fluid paths for water/AOS flow through the transportable system 100 (e.g., water input line 232, AOS output line 236, etc.).

The flow switch 230 can be configured to provide electric signals indicative of water/AOS flow through the AOS supply unit 200/system 100. For example, the flow switch 230 may be a mechanical flow switch/sensor, electromagnetic flow switch/sensor, pressure-based flow switch/sensor, optical flow switch/sensor, or the like, configured to provide an electric signal indicative of a flow of fluid (e.g., water/AOS) through the AOS supply unit 200/system 100. In some embodiments, the flow switch 230 may include solenoid-based flow switches/sensors, such as to avoid significant restriction of flow through the AOS supply unit 200/system 100.

In embodiments, the flow switch 230 is configured to transmit one or more control signals to the relay 232 in response to sensing a flow of water/AOS through the AOS supply unit 200/system 100. In response to receiving the one or more control signals, the relay 232 may cause the one or more ozone generators 206 to generate ozone. For example, the relay 232 may pass an activation and/or power signal onto the one or more ozone generators 206.

The flow switch 230 may be communicatively coupled to the relay 232 by one or more connectors (e.g., wires, cables, optical fibers, etc.) for transmitting signals between the flow switch 230 and the relay 232. In further embodiments, the AOS supply unit 200 may include a wireless communication interface (e.g., wireless receivers, transmitters, and/or transceivers) for receiving signals from the flow switch 230. For example, the flow switch 230 and the relay 210 may include wireless communication interfaces for sending/receiving wireless communication/control signals.

The AOS supply unit 200 may be configured to dispense an AOS (e.g., a water and ozone solution) having an ORP of between 600 mV and 1000 mV to provide pathogenic control without introduction of harsh treatment chemicals, such as chlorine. After operation of the AOS supply unit 200, the output AOS can provide removal of organic and inorganic compounds, can provide removal of micro-pollutants (e.g., pesticides), can provide enhancement of the flocculation/coagulation decantation process, can provide enhanced disinfection while reducing disinfection by-products, can provide odor and taste elimination of the treated water, and so forth. The solubility of ozone in water is quite good, about 10 to 15 times greater than for oxygen under normal drinking water treatment conditions. About 0.1 to 0.6 liters of ozone will dissolve in one liter of water. The size of the ozone gas bubbles can influence gas transfer characteristics. In some embodiments, the fluid mixer 218 and in-line mixer 220 generate an ozone bubble size of about 2 to about 3 microns. For instance, micro-bubbles can be produced and/or sheared into uniformed micro-size bubbles as the solution passes through the fluid pathways.

Corona discharge ozone can be used virtually anywhere. Since ozone is made on site, as needed, and where needed, there is no need to ship, store, handle or dispose of it, nor any containers associated with shipping, storing, handling, and disposing a treatment chemical, as is the situation with most chemicals utilized in water treatment.

The AOS supply unit 200 may be configured to provide indications pertaining to the operation status of the AOS supply unit 200/system 100, such as to ensure proper operation, or to provide an indication regarding a need for adjustment, servicing, or maintenance. For example, the flow switch 230 may be configured to send the signal to an indicator located on an exterior of the supply unit enclosure 202 to provide a visual, tactile, or audible indication that fluid (e.g., water/AOS) is flowing through the AOS supply unit 200/system 100. In some embodiments, the indicator is a light source (e.g., an LED) configured to illuminate upon receiving a signal from the flow switch 230. The indicator may also be coupled to a sensor (e.g., a relay) configured to measure that a voltage is applied to ozone generators 206. When a proper voltage is applied to the one or more ozone generators 206, the sensor can send a signal to the indicator. In some embodiments, the indicator will provide a visual, tactile, or audible indication when each sensor and the flow switch 230 provide their respective signals to the indicator. For example, the relay 210 can be coupled to the power source and the flow switch 230. The relay 210 may be configured to send an activation signal to the indicator when the power source is providing power to the one or more ozone generators 206 and when the flow switch 230 provides one or more signals regarding fluid flow through the AOS supply unit 200/system 100. In such a configuration, the indicator can verify that the AOS supply unit 200/system 100 is operating under design conditions (e.g., having an active flow of water, and having a sufficient power supply to the one or more ozone generators 206).

Referring again to FIG. 2, in some embodiments, the transportable system 100 (or AOS supply unit 200) may include an in-line ORP monitor 238 (e.g., ORP sensor/meter) positioned to measure the ORP of AOS dispensed from the AOS outlet 224, coupled within a distribution line, or the like. The in-line ORP monitor 238 can be coupled with the relay 210, such that the in-line ORP monitor 238 provides a signal to the relay 210 upon detection of a desired ORP or range of ORPs (e.g., at least 600 mV, at least 650 mV, at least 700 mV, at least 750 mV, at least 800 mV, at least 850 mV, at least 900 mV, at least 950 mV, etc.). The relay 210 can then provide an activation signal to the indicator upon proper functioning of the AOS supply unit 200/system 100 (e.g., when the power source is providing power to the one or more ozone generators 206, when the flow switch 230 provides one or more signals regarding fluid flow through the AOS supply unit 200/system 100, and when the in-line ORP monitor 238 detects a desired ORP of the AOS generated by the AOS supply unit 200/system 100). When the indicator is not activated, this can provide an indication that a component or components of the AOS supply unit 200/system 100 may need adjustment, servicing, or maintenance. Alternatively, the AOS supply unit 200/system 100 can be configured to activate the indicator upon failure of one or more of the components of the AOS supply unit 200/system 100 (e.g., no power supplied to the one or more ozone generators 206, no flow of water detected by the flow switch 230, or an out of range ORP detected by the in-line ORP monitor 238).

By providing an ORP of between 600 mV and 1000 mV with the AOS supply unit 200/system 100, the output AOS can be utilized to destroy various pathogens, including, but not limited to, algae (e.g., blue-green), bacteria (e.g., *Aeromonas* & *Actinomycetes, Bacillus*, Campylobacters, *Clostridium botulinum, Escherichia coli (E. coli), Flavobacterium, Helicobacter (pylori)*, Heterotrophic Bacteria, *Legionella pneumophila, Micrococcus, Mycobacterium tuberculosis, Pseudomonas aeruginosa, Salmonella, Shigella* shigellosis (dysentery), *Staphylococcus* sp, *albus, aureus, Streptococcus, Vibrio: alginolyticus*, anguillarium, *parahemolyticus, Yersinia enterocolitica*), fungi, molds, yeasts, mold spores, nematodes, protozoa (e.g., *Acanthamoeba* & *Naegleria*, Amoeboe Trophozoites, *Cryptosporidium, Cyclospora*, Entamobea (*histolytica*), Giardia lamblia, *Giardia muris, Microsporidium, N. gruberi*), trematodes, viruses (e.g., Adenovirus, Astrovirus, Cailcivirus, Echovirus, Encephalomyocarditis, Enterovirus, coxsachie, poliovirus, Hepatitis A, B and C, Myxovirus influenza, Norwalk, Picobirnavirus, Reovirus, Rotavirus).

In some implementations, incoming water may have a surface tension of about 72 Millinewtons per meter at 20° C. as it enters the AOS supply unit 200/system 100. The AOS supply unit 200/system 100 may be configured to reduce the surface tension of the water in the resulting AOS to about 48-58 Millinewtons per meter at 20° C. The reduced surface tension of the water enables the AOS being sprayed onto the hard surfaces and equipment to remove grease more effectively from hard surfaces and equipment since ozonated fluid is more capable of loosening and disintegrating any biofilm on the hard surfaces or equipment. The reduced surface tension of the water in the AOS better enables the cleansing of the hard surfaces and equipment since it more easily penetrates foreign material on the hard surfaces and equipment.

The AOS can be used for a variety of applications including, but not limited to: cleansing and/or degreasing hard surfaces such as plastic, glass, ceramic, porcelain, granite, stainless steel, aluminum, or the like; cleansing and/or degreasing equipment such as food service equipment such as ovens, ranges, fryers, grills, steam cookers, oven stacks, refrigerators, coolers, holding cabinets, cold food tables, worktables, ice machines, faucets, beverage dispensing equipment, beer dispensers, shelving food displays, dish washing equipment, grease traps, or the like; and/or cleansing and/or degreasing HVAC or plumbing systems such as roof top units, air scrubbers, humidifiers, water heaters, pumps, or the like.

As shown in FIGS. 1 and 2, the transportable system 100 includes a water input line 232 configured to supply water from a water source (e.g., a conventional water main/supply line, or the like) to the AOS supply unit 200. For example, the water input line 232 may have a connector 235 for connecting to a conventional water source (e.g., to a faucet) on one end and may be fluidically coupled to the water inlet 222 of the AOS supply unit 200 on the other end. As shown in FIG. 1, the water input line 232 may further include a shutoff valve 233 to turn on/off water supplied to the system 100 and/or control the rate at which water is supplied to the system 100. As shown in FIG. 2, in some embodiments, the water input line 232 includes or is coupled to a sediment filter 234 configured to remove particulates (e.g., sand, silt, dirt, rust, etc.) from water before the water enters the AOS supply unit 200. The AOS supply unit 200 is configured to produce an AOS (as described above) by mixing ozone into the water. The AOS is then output from the AOS supply unit 200 via the AOS outlet 224 which may be coupled to an AOS output line 236. As shown in FIG. 1, AOS output line 236 may also include a shutoff valve 237 for selectively enabling or disabling the flow of AOS through the AOS output line 236.

In some embodiments, the AOS output line 236 includes or is coupled to the ORP monitor 238. Additionally, the ORP monitor 238 may be communicatively coupled with an ORP monitor control unit 239. The ORP monitor control unit 239 may be configured to display the ORP value sensed by the ORP monitor 238, calibrate the ORP monitor 238, program ORP setpoints for the AOS supply unit 200/system 100, and/or communicate the ORP value or control signals based on the ORP value to the relay 210 of the AOS supply unit 200.

Referring again to FIG. 4, in some embodiments, the AOS supply unit 200 further includes a secondary AOS outlet 226 fluidically coupled in parallel with AOS outlet 224 (i.e., the primary AOS outlet). The secondary AOS outlet 226 may be coupled to the fluid path that runs between water inlet 222 and AOS outlet 224 by secondary fluid path that branches off to deliver AOS to the secondary AOS outlet 226. In this regard, the secondary AOS outlet 226 is capable of outputting a portion of the AOS dispensed by the system while another portion of the AOS is simultaneously output (in parallel) by AOS outlet 224. In some cases, it may be beneficial to use both AOS outlet 224 and AOS outlet 226, for example, to supply AOS to multiple components/devices (e.g., to output line 236 and a faucet, washing machine, another output line, or any other component/device). The AOS supply unit 200 may further include a cap 228 configured to selectively close the AOS outlet that is not in use (e.g., to close AOS outlet 224 or AOS outlet 226). In some embodiments, the cap 228 and at least one of the AOS outlets (e.g., AOS outlet 224 and/or AOS 226) are cooperatively threaded so that the cap 228 can be screwed onto the AOS outlet that is not being used to securely close it and dispense AOS only through the open AOS outlet. In other embodiments, an alternative means may be used to close or shut off one of the AOS outlets, such as a frictional force stopper, interference fit or snap fit cap, or a shutoff valve.

Figure 5:
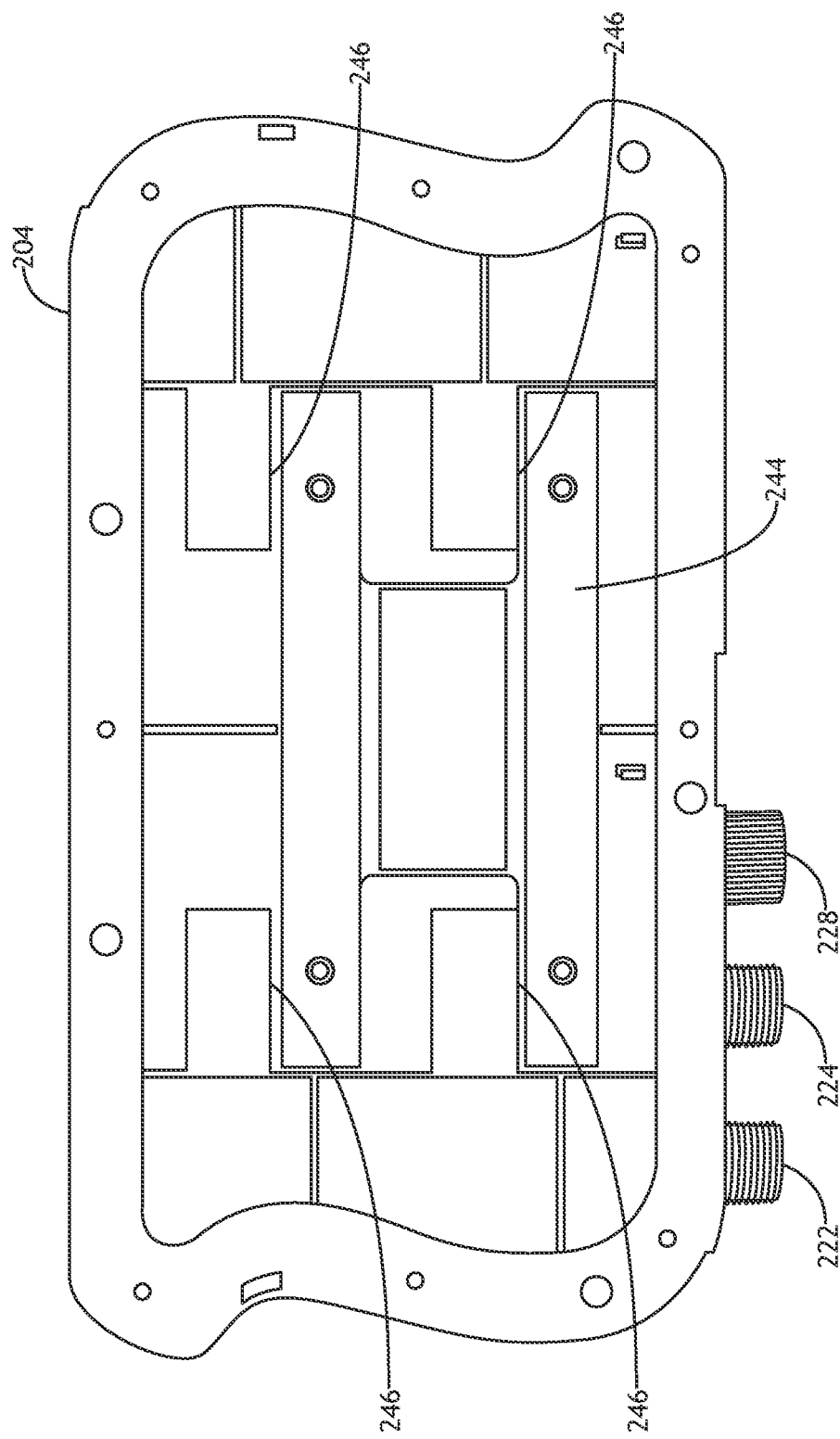
FIG. 5 is a rear view of the AOS supply unit, wherein the AOS supply unit is coupled to a mounting bracket via one or more slits in a base member of the AOS supply unit, in accordance with one or more embodiments of this disclosure.
Figure 6:
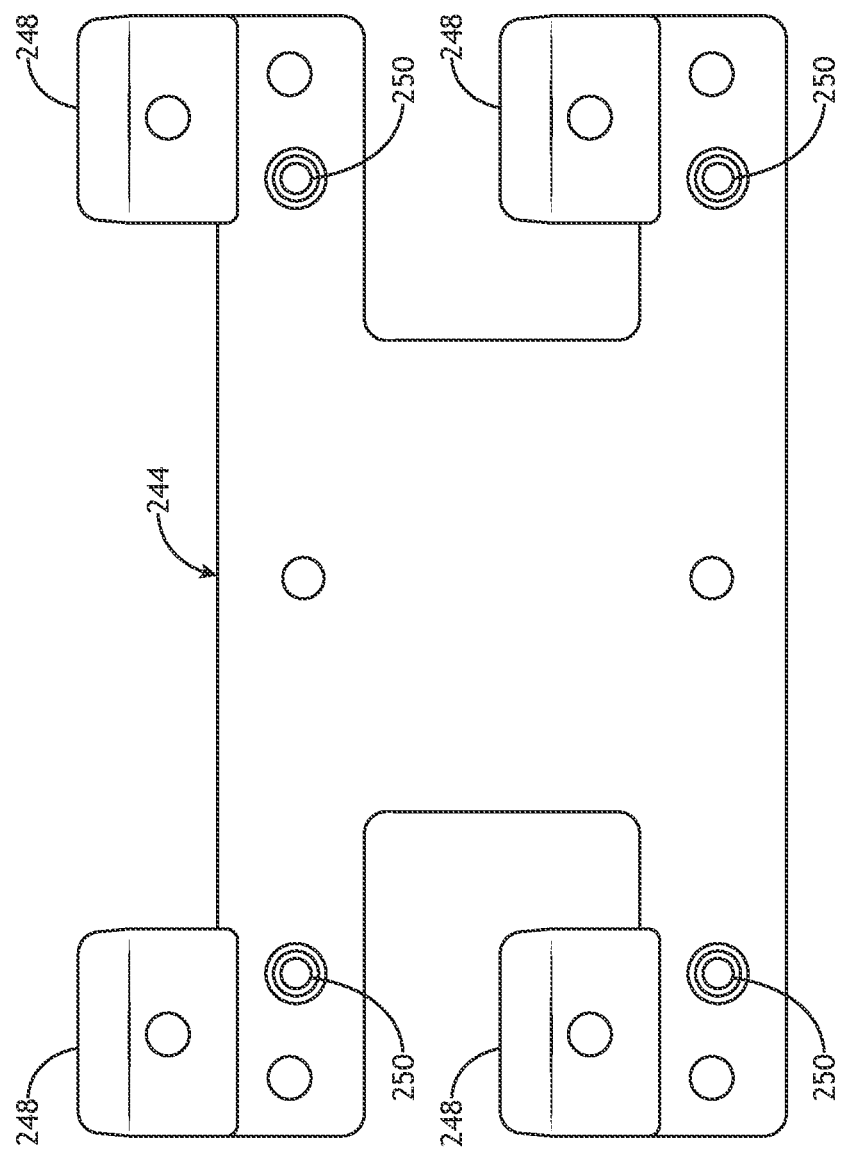
FIG. 6 is a front view of the mounting bracket, in accordance with one or more embodiments of this disclosure.

Further, as shown in FIGS. 5 and 6, the base member 204 can be removably coupled to a mounting bracket 244 that is configured to be secured to the wheeled frame 106. As shown in FIG. 6, the mounting bracket 244 may include a plurality of mounting members 248 for coupling the mounting bracket 244 to the base member 204 of the AOS supply unit 200. The mounting bracket 244 may further include a plurality of holes 250 configured to receive fasteners (e.g., screws/bolts) to secure the mounting bracket 244 to the wheeled frame 106 (i.e., to the one or more vertical support members of the wheeled frame 106). As shown in FIG. 5, the base member 204 of the AOS supply unit 200 may include a plurality of slits 246 that are configured to slide onto the mounting members 248 of the mounting bracket 244 so that the AOS supply unit 200 can be removably coupled to the wheeled frame 106 by the mounting bracket 244. Any other type of removable coupling interface may be used to connect the AOS supply unit 200 to the mounting bracket 244 so that the AOS supply unit 200 can be easily attached or removed from the mounting bracket 244 without having to use any tools. This enables the AOS supply unit 200 to be interchanged, serviced, or reconfigured without having to unscrew or disassemble any of the fixed components.

Although the invention has been described with reference to embodiments illustrated in the attached drawings, equivalents or substitutions may be employed without departing from the scope of the invention as recited in the claims. Components illustrated and described herein are examples of devices and components that may be used to implement embodiments of the present invention and may be replaced with other devices and components without departing from the scope of the invention. Furthermore, any dimensions, degrees, and/or numerical ranges provided herein are to be understood as non-limiting examples unless otherwise specified in the claims.

What is claimed is:

1. A transportable system for generating aqueous ozone solution, comprising:
  a wheeled frame;
  an outer enclosure surrounding at least a portion of the wheeled frame;
  an aqueous ozone solution supply unit disposed within the outer enclosure, the aqueous ozone solution supply unit comprising:
    a supply unit enclosure coupled to the wheeled frame, the supply unit enclosure including one or more openings for a water inlet and an aqueous ozone solution outlet;
    one or more ozone generators disposed within the supply unit enclosure; and
    a fluid mixer disposed within the supply unit enclosure, the fluid mixer being fluidically coupled to the one or more ozone generators and configured to inject ozone generated by the one or more ozone generators into water received from a water source via the water inlet to produce an aqueous ozone solution that is output via the aqueous ozone solution outlet; and a mounting bracket for removably coupling the aqueous ozone solution supply unit to the wheeled frame, the mounting bracket configured to be fastened to the wheeled frame, wherein the outer enclosure is configured to store one or more external components for the aqueous ozone solution supply unit and one or more cleaning accessories when the aqueous ozone solution supply unit is being transported via the wheeled frame.

2. The transportable system of claim 1, wherein the one or more external components for the aqueous ozone solution supply unit comprise: a power adapter; an extension cord; an ORP monitor; an ORP monitor control unit; a water input line; and an aqueous ozone solution output line.

3. The transportable system of claim 1, wherein the one or more cleaning accessories comprise one or more spray devices.

4. The transportable system of claim 3, wherein the one or more spay device include at least one portable electric sprayer or spray bottle configured to be filled with the aqueous ozone solution dispensed by the aqueous ozone solution supply unit, the at least one portable electric sprayer or spray bottle configured to release a spray, a mist, or a foam formed the aqueous ozone solution to disinfect or degrease a surface.

5. The transportable system of claim 1, wherein the fluid mixer comprises a venturi.

6. The transportable system of claim 5, wherein the fluid mixer further comprises and in-line mixer.

7. The transportable system of claim 1, wherein aqueous ozone solution supply unit further comprises:

a flow switch disposed within the supply unit enclosure, fluidically coupled in between the water inlet and the aqueous ozone solution outlet, the flow switch configured to generate a signal indicative of water flow between the water inlet and the aqueous ozone solution outlet.

8. The transportable system of claim 7, wherein the one or more ozone generators are configured to be selectively activated in response to the signal generated by the flow switch.

9. The transportable system of claim 1, wherein aqueous ozone solution supply unit further comprises:

an air stabilizer disposed within the supply unit enclosure, the air stabilizer configured to hold air before the air is supplied to the one or more ozone generators to generate ozone via one or more one or more tubes coupled to the air stabilizer.

10. The transportable system of claim 1, further comprising:

an ORP monitor fluidically coupled to the aqueous ozone solution outlet, the ORP monitor configured to detect an ORP of the aqueous ozone solution that is output via the aqueous ozone solution outlet.

11. The transportable system of claim 1, wherein the aqueous ozone solution supply unit further comprises:

a secondary aqueous ozone solution outlet fluidically coupled in parallel with the aqueous ozone solution outlet and also configured to output the aqueous ozone solution.

12. The transportable system of claim 11, wherein the aqueous ozone solution supply unit further comprises:

a cap configured to selectively close the aqueous ozone solution outlet or the secondary aqueous ozone solution outlet to selectively enable or disable the aqueous ozone solution outlet or the secondary aqueous ozone solution outlet.

13. The transportable system of claim 1, wherein a base member of the aqueous ozone solution supply unit includes a plurality of slits configured to slide onto mounting members of the mounting bracket so that the aqueous ozone solution supply unit is removably coupled to the wheeled frame by the mounting bracket.

14. The transportable system of claim 1, wherein the outer enclosure is at least partially made of fabric.

15. The transportable system of claim 14, wherein the outer enclosure includes a plurality of inner pockets at least partially made from the fabric.

16. The transportable system of claim 15, wherein the outer enclosure further includes a plurality of outer pockets at least partially made from the fabric.

17. The transportable system of claim 14, wherein the outer enclosure includes a zipper for closing the outer enclosure.

18. The transportable system of claim 17, wherein the outer enclosure includes one or more Velcro strips configured to fasten a top portion of the outer enclosure to the wheeled frame when the outer enclosure is unzipped so that the outer enclosure is held open.

19. The transportable system of claim 17, wherein the outer enclosure includes one or more handles for carrying the transportable system when the outer enclosure is zipped shut.

* * * * *